(12) United States Patent
Jung et al.

(10) Patent No.: US 12,403,638 B2
(45) Date of Patent: Sep. 2, 2025

(54) METHOD OF MANUFACTURING COVER WINDOW AND METHOD OF MANUFACTURING DISPLAY DEVICE

(71) Applicant: Samsung Display Co., LTD., Yongin-si (KR)

(72) Inventors: Kyu Ho Jung, Yongin-si (KR); Sang Chul Byun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 114 days.

(21) Appl. No.: 18/329,654

(22) Filed: Jun. 6, 2023

(65) Prior Publication Data

US 2024/0123661 A1    Apr. 18, 2024

(30) Foreign Application Priority Data

Oct. 13, 2022   (KR) .................. 10-2022-0131076

(51) Int. Cl.
*B29C 45/14* (2006.01)
*B29C 45/00* (2006.01)
*B29C 65/48* (2006.01)
*B29L 31/34* (2006.01)

(52) U.S. Cl.
CPC .... *B29C 45/14467* (2013.01); *B29C 45/0001* (2013.01); *B29C 45/0053* (2013.01); *B29C 45/14688* (2013.01); *B29C 65/4805* (2013.01); *B29C 2045/0075* (2013.01); *B29C 2045/14745* (2013.01); *B29C 2045/14885* (2013.01); *B29L 2031/3475* (2013.01)

(58) Field of Classification Search
CPC .......... B29L 2031/3475; H10K 71/135; B29C 45/14688; B29C 65/4805; B29C 2045/0075; B29C 2045/14745; B29C 2045/14885
See application file for complete search history.

(56) References Cited

U.S. PATENT DOCUMENTS

| 2016/0181592 | A1* | 6/2016 | Chung ............ H01L 31/022466 427/58 |
| 2017/0088758 | A1* | 3/2017 | Bzowej ................ C08G 18/348 |
| 2018/0210584 | A1* | 7/2018 | Choi ........................ G06F 3/047 |

FOREIGN PATENT DOCUMENTS

KR    10-2022-0022927    3/2022

* cited by examiner

*Primary Examiner* — Abbas Rashid
*Assistant Examiner* — Elisa H Vera
(74) *Attorney, Agent, or Firm* — Sughrue Mion, PLLC

(57) ABSTRACT

A method of manufacturing a display device, the method including ejecting a window raw material into a mold, precuring the ejected window raw material, molding a cover window by placing the precured window raw material onto a display panel and curing the precured window raw material, and separating the mold from the cover window.

24 Claims, 19 Drawing Sheets

METHOD OF MANUFACTURING COVER WINDOW AND METHOD OF MANUFACTURING DISPLAY DEVICE

CROSS-REFERENCE TO RELATED APPLICATIONS

This application claims priority under 35 U.S.C. § 119 from Korean Patent Application No. 10-2022-0131076 filed on Oct. 13, 2022 in the Korean Intellectual Property Office, the entire contents of which are incorporated herein by reference.

BACKGROUND

1. Technical Field

The disclosure relates to a method of manufacturing a cover window and a method of manufacturing a display device.

2. Description of the Related Art

Portable electronic devices have been widely used. Small electronic devices, e.g., mobile phones, tablet personal computers (PCs), etc., have been widely used as portable electronic devices.

In order to support various functions, each portable electronic device includes a display device to provide visual information, e.g., an image or a video, to a user. As other components of the portable electronic device for driving the display device have recently been miniaturized, the proportion of the display area in the electronic device is gradually increasing, and research is underway to expand the display area of the display device to provide an image or a video.

The display device may include a cover window that protects the display panel of the display device. The cover window may be disposed on the outermost side of the display device and may be a component in direct contact with the user.

SUMMARY

Aspects of the disclosure provide a method of manufacturing a display device in which the fabrication of a cover window and the bonding of the cover window to a display panel may be performed simultaneously.

Aspects of the disclosure also provide a method of manufacturing a cover window of any desired three-dimensional (3D) shape via an inkjet technique.

However, aspects of the disclosure may not be restricted to those set forth herein. The above and other aspects of the disclosure will become more apparent to one of ordinary skill in the art to which the disclosure pertains by referencing the detailed description of the disclosure given below.

According to an aspect of the disclosure, a method of manufacturing a display device may include ejecting a window raw material into a mold, precuring the ejected window raw material, molding a cover window by placing the precured window raw material onto a display panel and curing the precured window raw material, and separating the mold from the cover window.

In the ejecting of the window raw material the window raw material is ejected into the mold by an inkjet technique.

The window raw material may include a material selected from a group consisting of siloxane, epoxy, and a combination thereof, and the cover window may include a material selected from a group consisting of siloxane, epoxy, and a combination thereof.

A curing energy used in the molding the cover window may be about three times higher than a curing energy used in the precuring of the window raw material.

The curing energy used in the precuring the window raw material may be in a range of about 800 mJ to about 1200 mJ.

The curing energy used in the molding the cover window may be in a range of about 2500 mJ to about 3500 mJ.

The molding of the cover window may further include treating a top surface of the display panel to which the precured window raw material may be bonded with plasma before the placing of the precured window raw material on the display panel.

The method may further include between the precuring of the ejected window raw material and the molding of the cover window, forming a printed pattern that defines a non-display area of the display device on the precured window raw material, wherein the printed pattern may include a material selected from a black pigment, a dye, a light absorbing material and a combination thereof.

The printed pattern may be produced by an inkjet technique.

The method may further include, before the ejecting of the window raw material into the mold, applying a release agent onto a support surface of the mold onto which the window raw material is to be ejected.

The display panel may include a display element layer disposed on a substrate, the display element layer may include a plurality of pixels that may include a plurality of pixel electrode, a plurality of light-emitting layer, a common electrode and a pixel-defining film that defines the plurality of pixels, and a thin-film encapsulation layer disposed on the display element layer.

At least one of an optical film and an input detection sensor may be further disposed on the display panel.

According to another aspect of the disclosure, a method of manufacturing a display device may include ejecting a window raw material into a mold, precuring the ejected window raw material, forming a printed pattern that defines a non-display area of the display device, on the precured window raw material, molding a cover window by curing the precured window raw material, bonding the cover window disposed in the mold to a display panel by using an adhesive, and separating the mold from the cover window.

In the ejecting of the window raw material, the window raw material is ejected into the mold by an inkjet technique.

The window raw material may include a material selected from a group consisting of siloxane, epoxy, and a combination thereof, and the cover window may include a material selected from a group consisting of siloxane, epoxy, and a combination thereof.

The printed pattern may include a material selected from a group consisting of a black pigment, a dye, a light absorbing material, and a combination thereof.

The printed pattern may be formed by an inkjet technique.

The adhesive may include a material selected from a group consisting of an optically clear adhesive (OCA), an optically clear resin (OCR), and a combination thereof.

According to another aspect of the disclosure, a method of manufacturing a display device may include ejecting a window raw material into a mold, precuring the ejected window raw material, forming a printed pattern that defines a non-display area of the display device, on the precured window raw material and molding a cover window by curing the precured window raw material.

In the ejecting of the window raw material, the window raw material may be ejected into the mold by an inkjet technique, the window raw material may include a material selected from a group consisting of siloxane, epoxy, and a combination thereof, and the cover window may include a material selected from a group consisting of siloxane, epoxy, and a combination thereof.

According to the aforementioned and other embodiments of the disclosure, any foreign matter defects in a cover window may be minimized by performing the fabrication of the cover window and the bonding of the cover window to a display panel simultaneously. Also, an inkjet technique or a three dimensional printing (i.e., 3D printing) technique or additive manufacturing technique may be used to produce a cover window into any desired 3D (i.e., three dimensional) shape.

It should be noted that the effects of the disclosure may not be limited to those described above, and other effects of the disclosure will be apparent from the following description.

BRIEF DESCRIPTION OF THE DRAWINGS

An additional appreciation according to the embodiments of the disclosure will become more apparent by describing in detail the embodiments thereof with reference to the accompanying drawings, wherein.

DETAILED DESCRIPTION OF THE EMBODIMENTS

Figure 1:
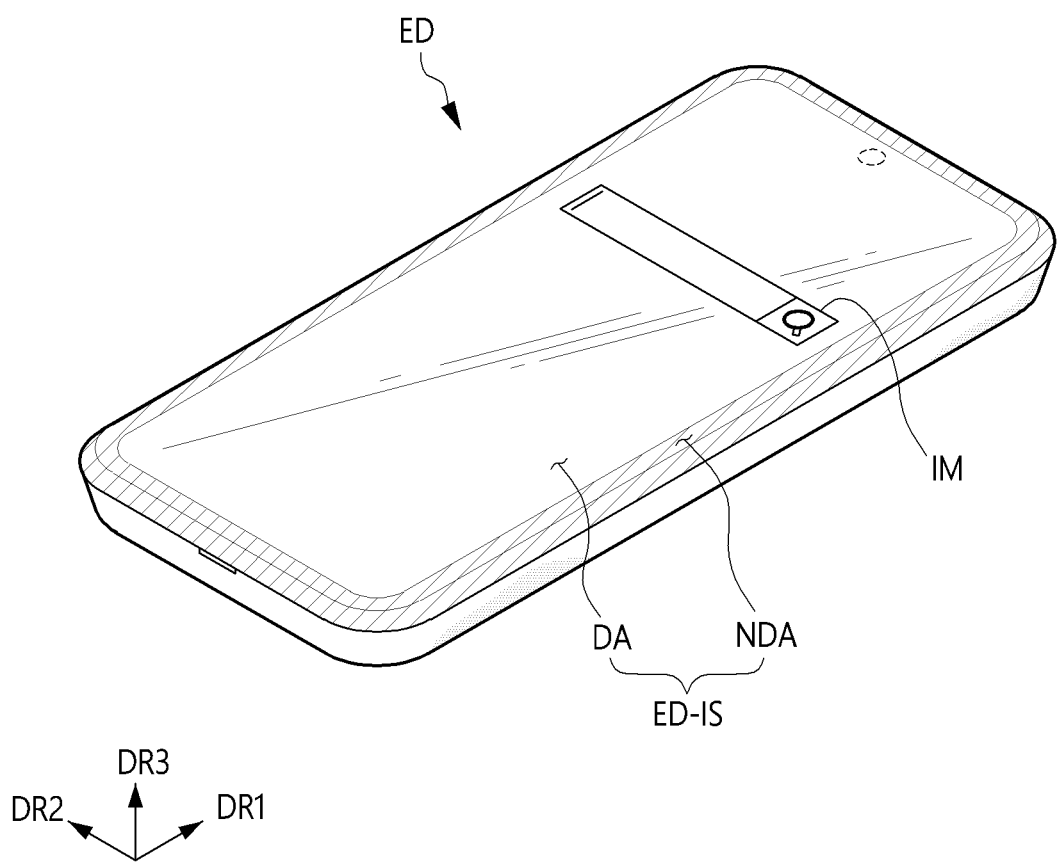
FIG. 1 is a perspective view of an electronic device according to an embodiment of the disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another.

For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Figure 2:
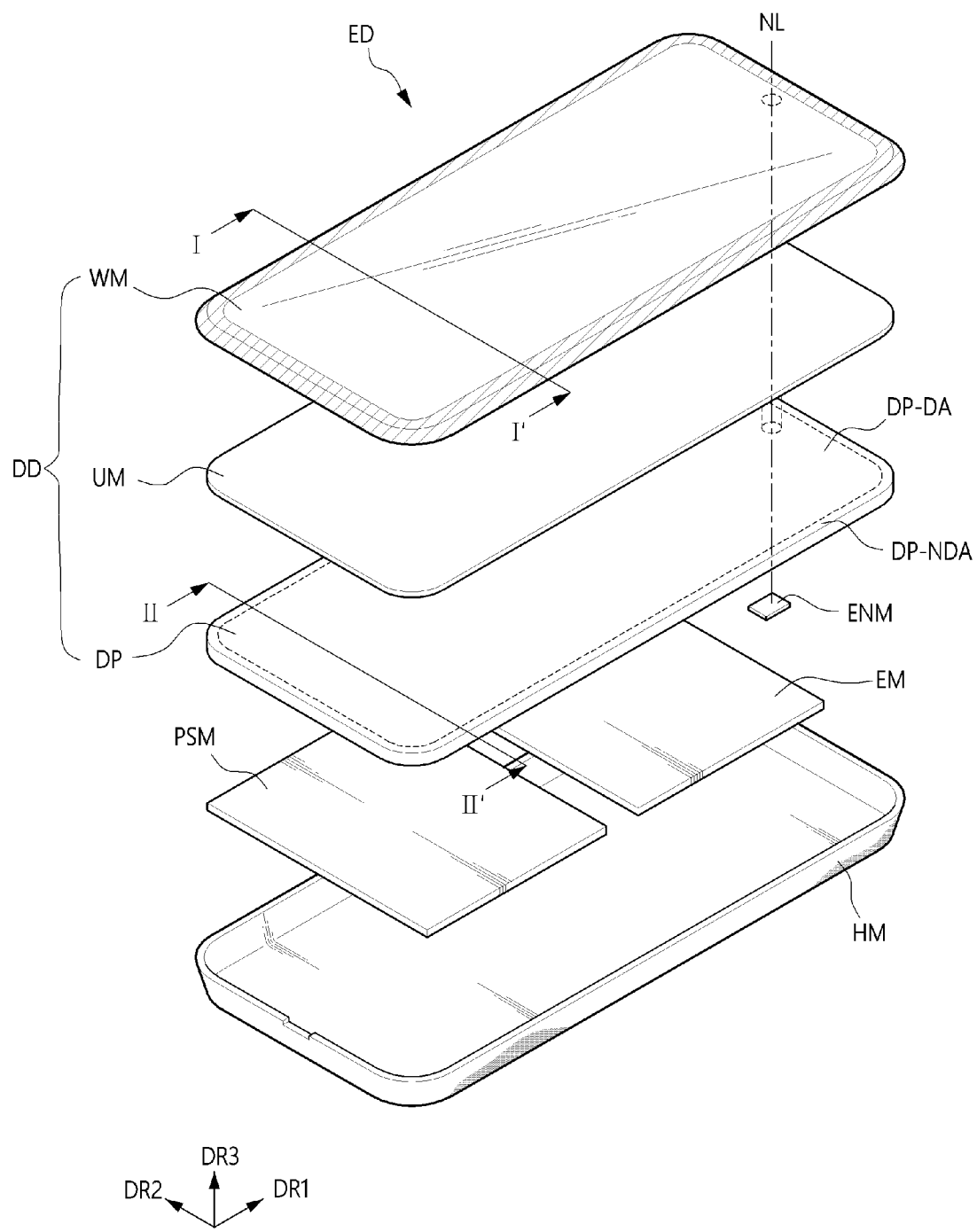
FIG. 2 is an exploded perspective view of the electronic device of FIG. 1.

FIG. 1 is a perspective view of an electronic device according to an embodiment of the disclosure, and FIG. 2 is an exploded perspective view of the electronic device of FIG. 1. Referring to FIG. 1, an electronic device ED that may be a device for displaying a moving image or a still image, may be used not only in a portable electronic device such as a mobile phone, a smartphone, a tablet personal computer (PC), a smart watch, a watch phone, a mobile communication terminal, an electronic notebook, an electronic book, a portable multimedia player (PMP), a navigation device, or an ultra-mobile PC (UMPC), but also in various other products such as a television (TV), a notebook computer, a monitor, a billboard, or an Internet-of-Things (IoT) device. The electronic device ED may be one of an organic light-emitting diode (OLED) display device, a liquid crystal display (LCD) device, a plasma display device, a field emission display (FED) device, an electrophoretic display (EPD) device, an electrowetting display device, a quantum dot light-emitting diode (QLED) display device, and a micro light-emitting diode (mLED) display device. The electronic device ED will hereinafter be described as being an OLED display device, but the disclosure may not be limited thereto.

The electronic device ED may display an image IM through a display surface ED-IS. The display surface ED-IS may be parallel to a plane defined by first and second directional axes DR1 and DR2. The normal direction of the display surface ED-IS, i.e., the thickness direction of the electronic device ED may indicate a third direction axis DR3. The display surface ED-IS of the electronic device ED may correspond to the front surface of the electronic device ED and the top surface of a cover window WM. The cover window WM may also be referred to as simply the window WM.

The front (or top surface) and the rear (or bottom surface) of each member or unit that will hereinafter be described may be defined by the third direction axis DR3. However, the first, second, and third directional axes DR1, DR2, and DR3 are merely exemplary. First, second, and third directions may be defined as directions indicated by the first, second, and third directional axes DR1, DR2, and DR3 and may be denoted by the same reference numerals or characters as the first, second, and third directional axes DR1, DR2, and DR3.

The display surface ED-IS may include a display area DA, in which pixels may be disposed, and a non-display area NDA that may be adjacent to the display area DA. The non-display area NDA may be an area where an image may be displayed. The non-display area NDA blocks optical signals, and may be an area disposed on the outside of the display area DA to surround the display area DA in a plan view. The non-display area NDA may be disposed on sides of the electronic device ED rather than on the front surface of the electronic device ED. The non-display area NDA may be optional. The display surface ED-IS may be illustrated as being flat, but the disclosure may not be limited thereto. Alternatively, curved areas may be disposed on both sides in the second direction DR2 of the display surface ED-IS.

Referring to FIG. 2, the electronic device ED may include a display device DD, an electronic module EM, an electro-optical module ENM, a power supply module PSM, and a housing HM. The display device DD may generate an image. The display device DD may include a display panel DP, an upper member UM, and the cover window WM. A display area DP-DA and a non-display area DP-NDA, which correspond to the display area DA and the non-display area NDA respectively of the electronic device ED, may be defined in the display panel DP.

The display panel DP may be, but may not be limited to, a light-emitting display panel such as an organic light-emitting display panel or an inorganic light-emitting display panel. The display device DD may also sense external input and/or external pressure depending on the configuration of the upper member UM. The upper member UM may include various members. The upper member UM may include an optical film and an input detection sensor. The optical film may lower the reflectance of external light. The optical film may include a polarizer and a retarder. The polarizer and the retarder may be of a stretch type or a coating type. The optical axis of a coating-type optical film may be defined by the stretching direction of a functional film. The coating-type optical film may include a base film and liquid crystal molecules arranged on the base film. The input detection sensor may detect external input from a user. The input detection sensor may sense external input in a capacitive method, a pressure sensing method, or an electromagnetic induction method.

The cover window WM may provide the exterior of the electronic device ED. The cover window WM may be formed of an optically-clear insulating material. The cover window WM may be formed of siloxane, epoxy, or a combination thereof that can be subjected to a low-temperature process.

Although not specifically illustrated, the display device DD may also include one or more adhesive layers. The adhesive layers may bond the cover window WM to the upper member UM, the upper member UM to the display panel DP, or the lower member LM to the display panel DP. The adhesive layers may bond the elements of the upper member UM to the elements of the lower member LM. The adhesive layers may be optically clear adhesive (OCA) layers or pressure sensitive adhesive (PSA) layers.

The electronic module EM may include a control module, a wireless communication module, an image input module, a sound input module, a sound output module, a memory, and an external interface module. These modules may be mounted on a circuit board or may be electrically connected via a flexible circuit board. The electronic module EM may be electrically connected to the power supply module PSM.

The control module may control the overall operation of the electronic device ED. For example, the control module may activate or deactivate the display device DD in accordance with user input. The control module may control the image input module, the sound input module, and the sound output module in accordance with the user input. The control module may include at least one microprocessor.

The power supply module PSM may supply power necessary for the overall operation of the electronic device ED. The power supply module PSM may include a typical battery device.

The housing HM may extend from the display device DD, for example from the cover window WM, and may accommodate the other elements of the electronic device ED. FIG. 2 illustrates that the housing HM may consist of a single element, but the disclosure may not be limited thereto. Alternatively, the housing HM may consist of two or more elements.

The electro-optical module ENM may be an electronic part outputting or receiving optical signals. The electro-optical module ENM may transmit or receive optical signals via part of the display device DD. The electro-optical module ENM may include a camera module. The camera module may receive natural light NL through the display area DP and captures an image from the outside. The electro-optical module ENM may further include a proximity sensor or an infrared light sensor.

The electro-optical module ENM may be disposed below the display device DD. The electro-optical module ENM may overlap with the display area DP of the display device DD. The display device DD will hereinafter be described in further detail.

Figure 3:
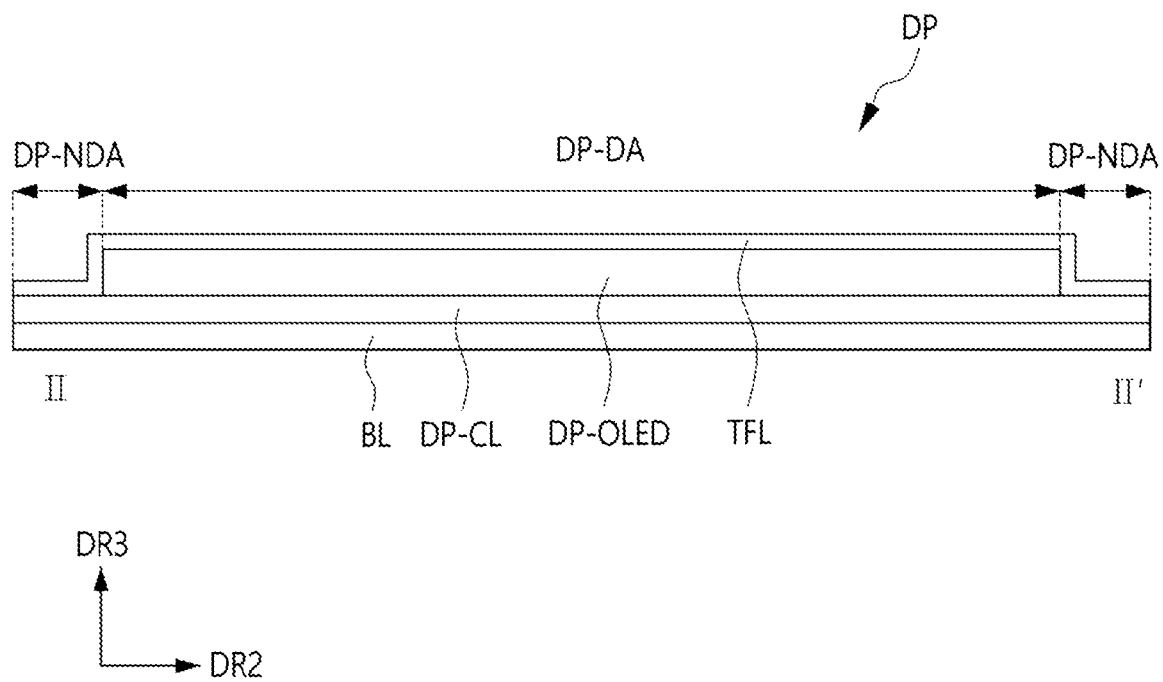
FIG. 3 is a schematic cross-sectional view, taken along line II-II' of FIG. 2 of a display panel of the electronic device of FIG. 1.

FIG. 3 is a schematic cross-sectional view taken along line II-II' of FIG. 2 of the display panel of the electronic device of FIG. 1. Referring to FIG. 3, the display panel DP may include a base layer BL, a circuit device layer DP-CL, a display element layer DP-OLED, and an upper insulating layer TFL. The base layer BL may include a plastic substrate, a glass substrate, a metal substrate, an organic/inorganic hybrid material substrate, or a combination thereof. As an example, the base layer BL may include at least one polyimide layer.

The circuit element layer DP-CL may include at least one insulating layer, semiconductor patterns, and conductive patterns. The insulating layer may include at least one inorganic layer and at least one organic layer. The semiconductor patterns and the conductive patterns may form signal lines, pixel driving circuits, and scan driving circuits. This will be described later.

The display element layer DP-OLED may include display elements such as, for example, OLEDs. The display element layer DP-OLED may further include an organic layer such as a pixel-defining film.

The upper insulating layer TFL may include multiple thin films. Some of the thin films may be disposed to improve optical efficiency, and some of the thin-films may be disposed to protect the OLEDs. The upper insulating layer TFL may include a thin-film encapsulation layer having a structure in which an inorganic layer, an organic layer, and an inorganic layer may be stacked on each other.

Figure 4:
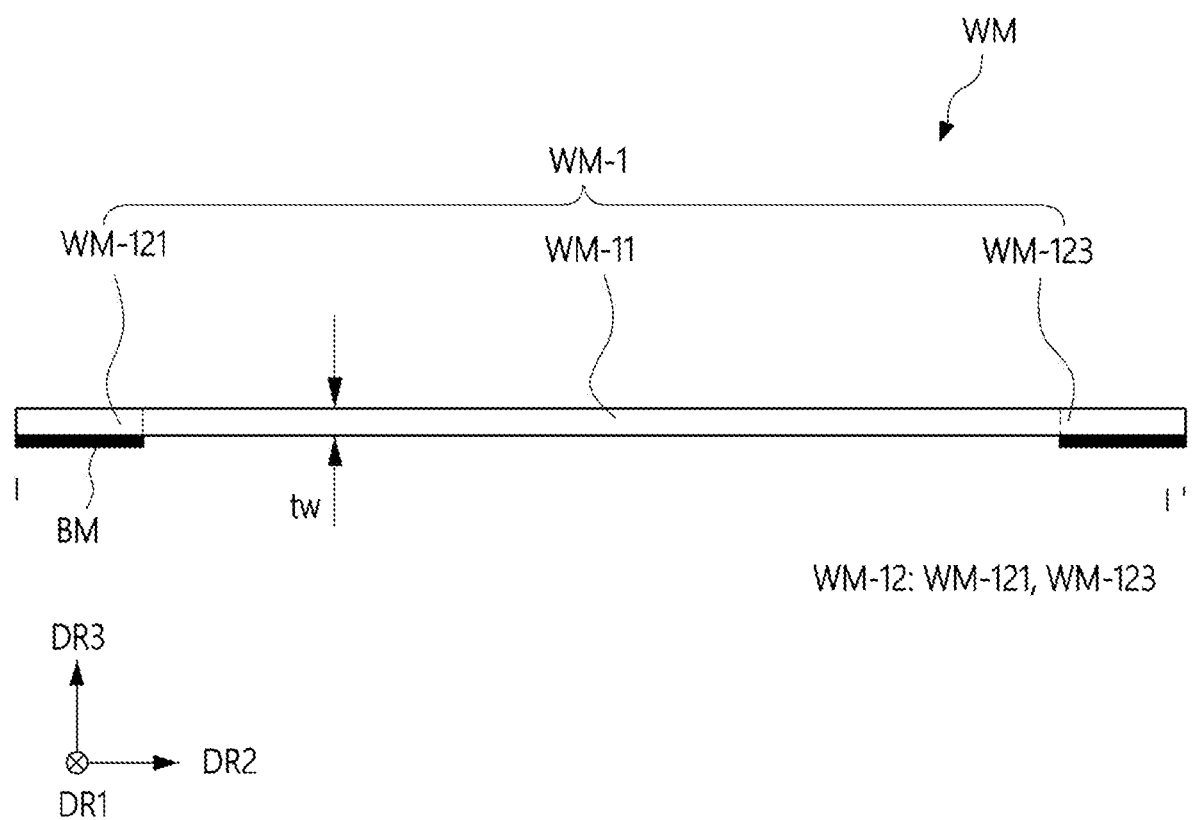
FIGS. 4 through 6 are schematic cross-sectional views taken along line I-I' of FIG. 1 of cover windows according to various embodiments of the disclosure.
Figure 5:
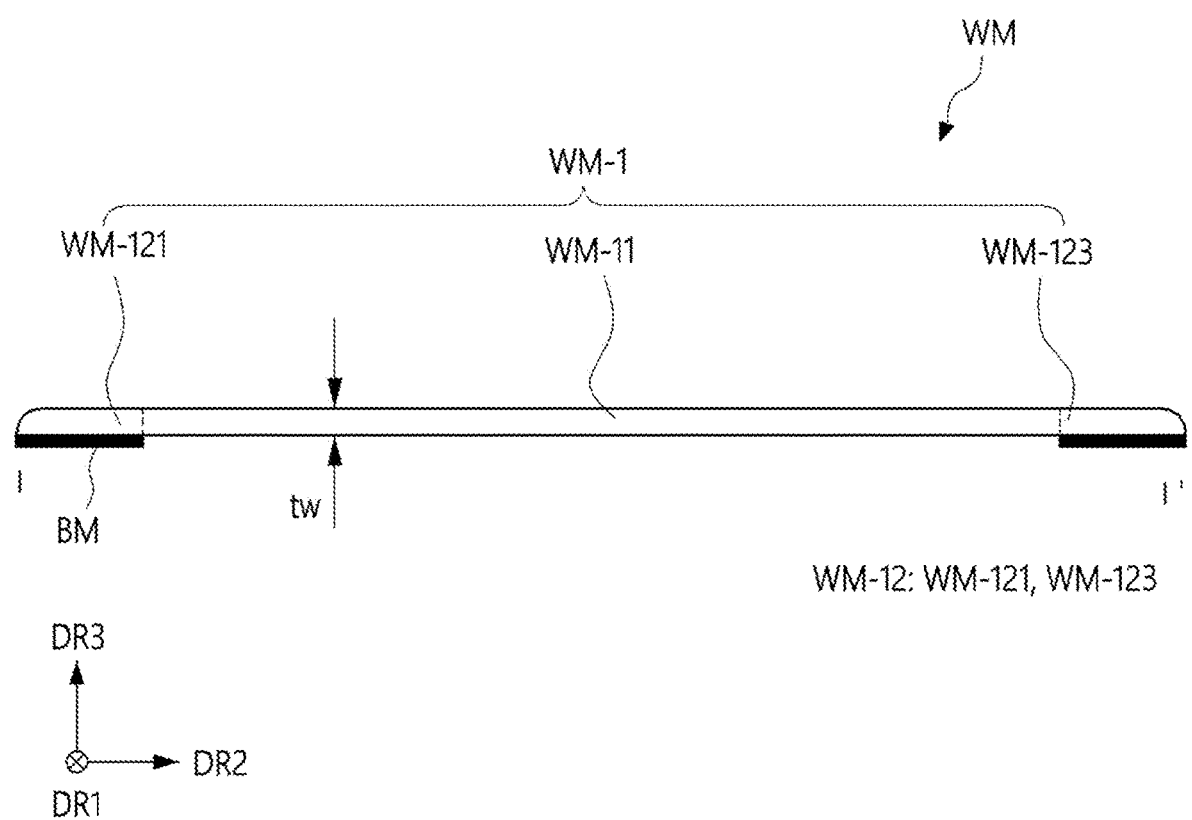
Figure 6:
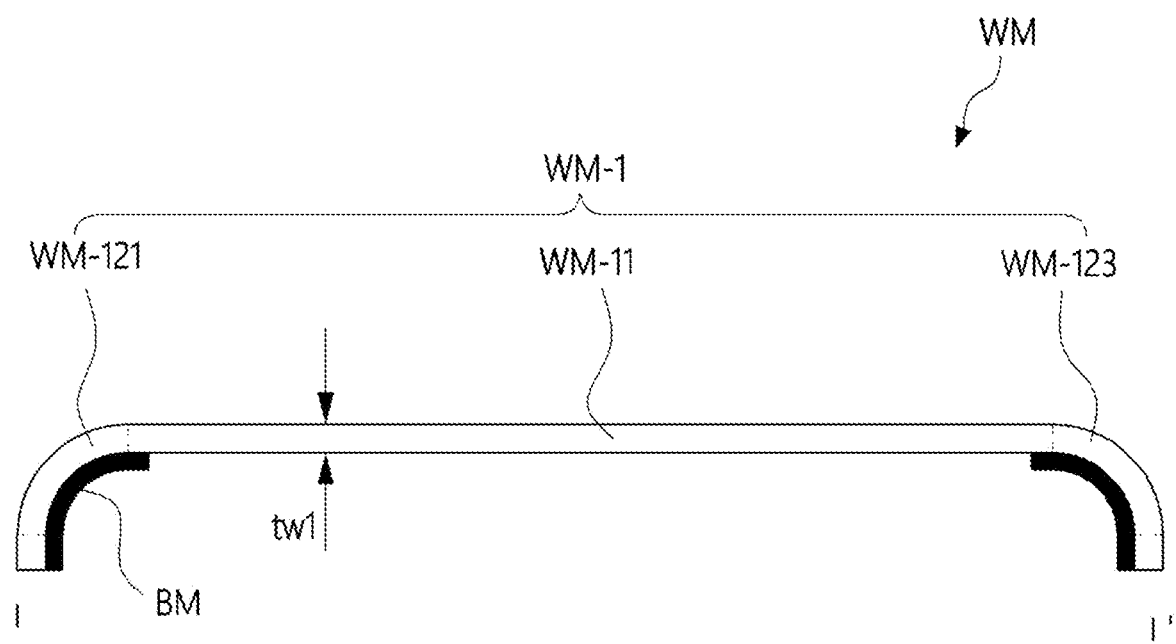

FIGS. 4 through 6 are schematic cross-sectional views taken along line I-I' of FIG. 1 of cover windows according to various embodiments of the disclosure. Referring to FIGS. 4 through 6, the cover window WM may be disposed in a direction in which the display device DD outputs an image.

The cover window WM may include a window base WM-1 and a printed pattern BM which may be printed on the window base WM-1. The window base WM-1 may include a light-transmitting part WM-11 and a side part WM-12, which may be bent and extend from the light-transmitting part WM-11. The side part WM-12 may include first and second side parts WM-121 and WM-123 which extend from both sides of the light-transmitting part WM-11. The light-transmitting part WM-11 may be parallel to a plane defined by the first and second directions DR1 and DR2. The side part WM-12 may overlap the non-display area DP-NDA of the display panel DP.

The thickness of the cover window WM may correspond to a thickness tw or tw1 of the light-transmitting part WM-11. The thickness tw or tw1 of the light-transmitting part WM-11 will be described later with reference to FIGS. 11 and 12.

The side part WM-12 may be chamfered, as illustrated in FIG. 5. The side part WM-12 may have a rectangular shape with rounded corners in a plan view. The side part WM-12 may be bent at an angle of 90° or greater, as illustrated in FIG. 6. A bending angle α that the ends of the first and second side parts WM-121 and WM-123 form with the plane defined by the light-transmitting part WM-11 may be an obtuse angle of 90° or greater. The first and second side parts WM-121 and WM-123 may be bent at an obtuse angle of 90° or greater with respect to the plane defined by the light-transmitting part WM-11. The bending angle α that the first side part WM-121 forms with the plane defined by the light-transmitting part WM-11 may be the same as or differ from the bending angle α that the second side part WM-123 forms with the plane defined by the light-transmitting part WM-11. For example, the first and second side parts WM-121 and WM-123 may be bent at angles of 120° and 160° respectively with respect to the plane defined by the light-transmitting part WM-11.

The printed pattern BM may be a colored layer and may include a material capable of absorbing light. The non-display area NDA may be defined by the printed pattern BM. The printed pattern BM may overlap the non-display area NDA. The printed pattern BM may be viewed as black if a light-blocking layer including a black pigment, a dye or a light absorbing material may be applied as the printed pattern BM. For example, the printed pattern BM may include a blue or a black pigment. The non-display area NDA may be defined by the printed pattern BM.

The printed pattern BM may be disposed along the edges of the window base WM-1. The printed pattern BM may be disposed in the side part WM-12. The printed pattern BM may be disposed to be aligned with the ends of the side part WM-12. The printed pattern BM may be disposed from the ends of the side part WM-12 to the edges of the light-transmitting part WM-11. The printed pattern BM may be disposed in both the first and second side parts WM-121 and WM-123.

FIGS. 4 through 6 illustrate that the printed pattern BM may be provided, but the printed pattern BM may be optional. At least part of the side part WM-12 may be used as a bonding surface for bonding the cover window WM to the housing HM.

Figure 7:
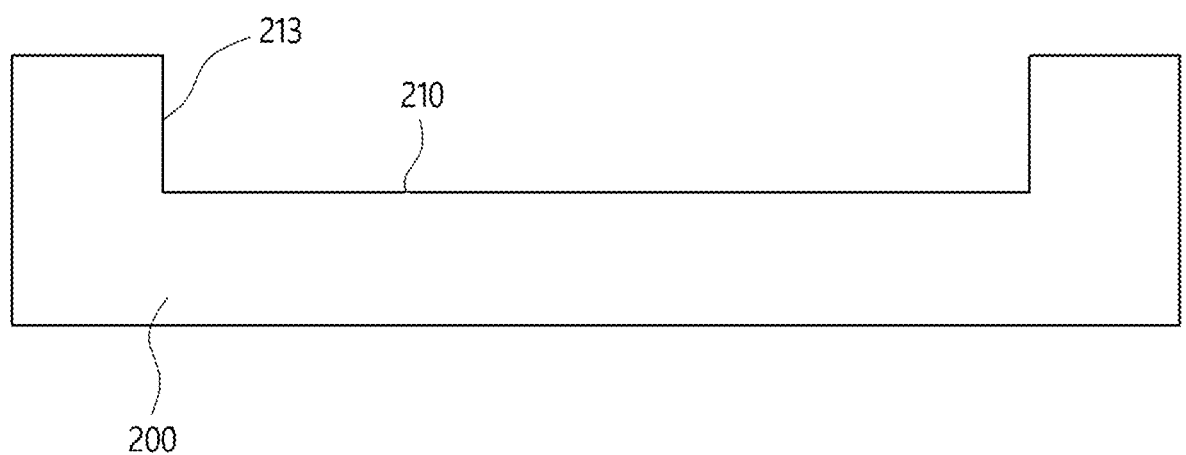
FIGS. 7 and 8 are schematic cross-sectional views of molds for fabricating a cover window.
Figure 8:

FIGS. 7 and 8 are schematic cross-sectional views of molds for fabricating a cover window. Referring to FIGS. 7 and 8, a mold 200, which may be for forming a cover window via an inkjet technique, may include a support surface 210 which can hold a window raw material WMm for forming the cover window WM. The shape of the cover window WM, which may be formed by the mold 200, may be dependent on the shape of the support surface 210.

For example, a mold 200 for the cover window WM of FIG. 4, which has a rectangular parallelepiped shape, may include a rectangular support surface 210 with right-angled corners 213 as illustrated in FIG. 7. In an example, a mold 200 for the cover window WM of FIGS. 5 and 6, which has a chamfered shape, may include a support surface 210 with rounded corners 212 to correspond to the chamfered shape of the cover window WM.

The support surface 210 may be filled or coated with the window raw material WMm via an inkjet technique. The window raw material WMm may refer to a window material yet to be molded and may include a same material as the cover window WM. The window raw material WMm may be coated at a desired location to a desired thickness. The support surface 210 of the mold 200 may be formed into a concave structure and may thus safely store the window raw material WMm yet to be cured by preventing the window raw material WMm from splashing or overflowing into areas other than the support surface 210 before curing and molding.

The mold 200 may be formed of a rigid material. The mold 200 may be formed of any suitable material, for example a plastic resin. More specifically, the mold 200 may include at least one of polyethylene terephthalate (PET), polyvinyl chloride (PVC), polypropylene (PP), polyvinylidene chloride (PVDC), polyethylene (PE), polytetrafluoroethylene (PTFE), and a combination thereof, but the disclosure may not be limited thereto.

Figure 9:
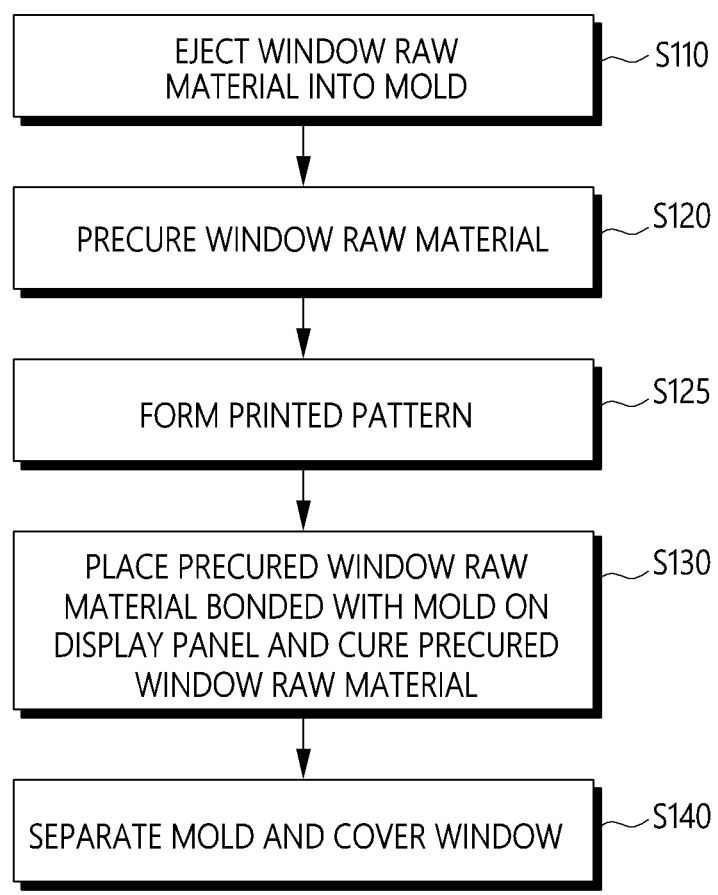
FIG. 9 is a flowchart illustrating a method of manufacturing a display device according to an embodiment of the disclosure.

FIG. 9 is a flowchart illustrating a method of manufacturing a display device according to an embodiment of the disclosure. FIGS. 10 through 19 are schematic cross-sectional views or perspective views illustrating the method of FIG. 9.

Figure 10:
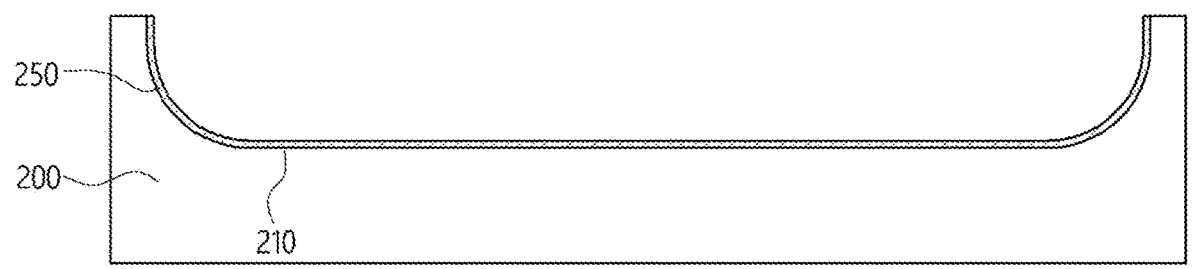
FIGS. 10 through 19 are schematic cross-sectional views or perspective views illustrating the method of FIG. 9.

Referring to FIG. 9, a window raw material WMm may be ejected into a mold 200 (S110). Referring to FIG. 10, the mold 200 may first be coated with a release agent 250 prior to the ejection of the window raw material WMm into the mold 200. The release agent 250 may be coated on the support surface 210 of the mold 200.

Figure 11:
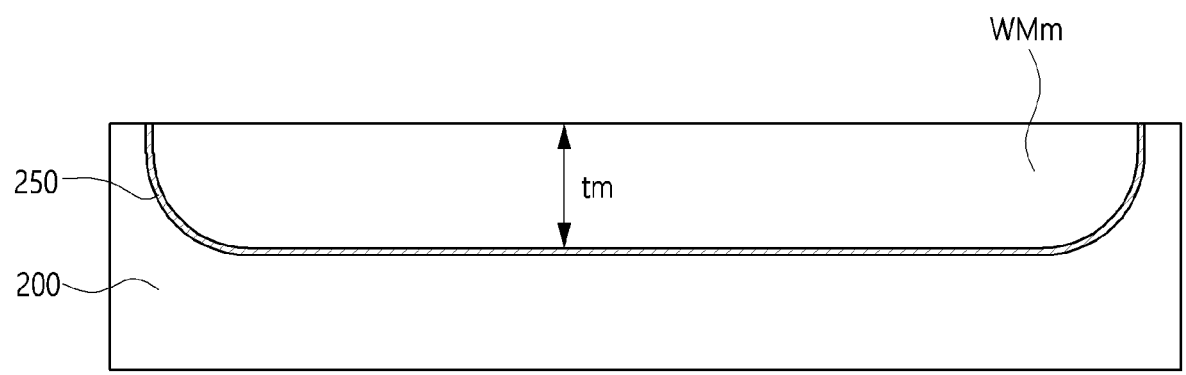
Figure 12:
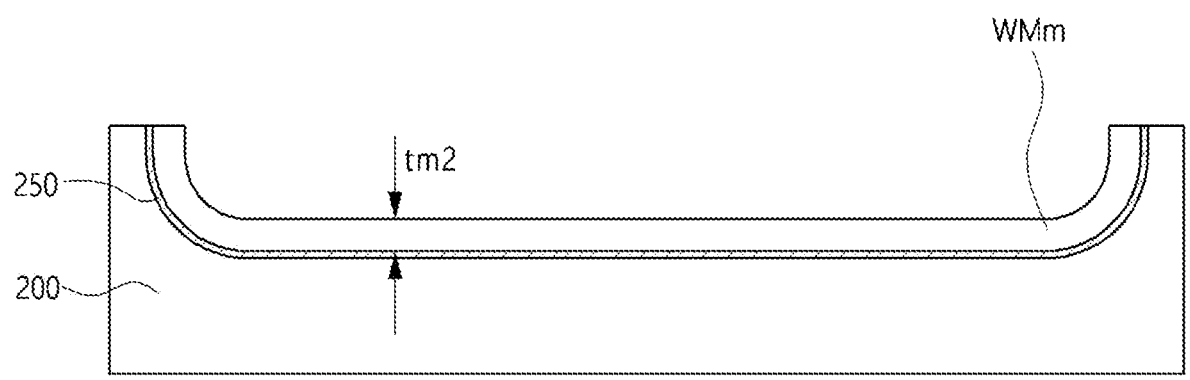

Thereafter, referring to FIGS. 11 and 12, the window raw material WMm may be ejected onto the support surface 210 of the mold 200 via an inkjet technique. Here, the inkjet technique may be advantageous in that it may not be in need of a mask because of the use of fine nozzles. As a result, the inkjet printing process may have a short printing period, and may be relatively simple.

The window raw material WMm, which may be a raw material for forming a cover window WM, may include an optically-clear insulating material. The window raw material WMm may include one of siloxane, epoxy, or a combination thereof that can be subjected to a low-temperature process. The window raw material WMm may be formed up to the top surface of the mold 200 to have a thickness tm as illustrated in FIG. 11. Alternatively, the window raw material WMm may be coated to have a same thickness as a cover window WM, i.e., a thickness tm2, as illustrated in FIG. 12.

The thickness tm or tm2 of the window raw material WMm coated on the inside of the mold 200 of FIG. 11 may be greater than or substantially the same as the maximum thickness of the cover window WM after molding. For example, if the cover window WM of FIG. 5 may be formed by using the window raw material WMm of FIG. 11, the thickness tm of the window raw material WMm of FIG. 11 may be greater than or substantially the same as a maximum thickness tw of the light-transmitting part WM-11 of the cover window WM of FIG. 5. In an example, if the cover window WM of FIG. 6 may be formed by using the window raw material WMm of FIG. 12, the thickness tm2 of the window raw material WMm of FIG. 12 may be greater than or substantially the same as a maximum thickness tw1 of the light-transmitting part WM-11 of the cover window WM of FIG. 6.

Thereafter, referring to FIG. 9, the window raw material WMm may be precured (or partially cured or mildly cured) (S120). The fluidity of the window raw material may be reduced by precuring the window raw material. The curing energy for precuring the window raw material may be about 800 mJ to about 1200 mJ, preferably about 1000 mJ.

Figure 13:
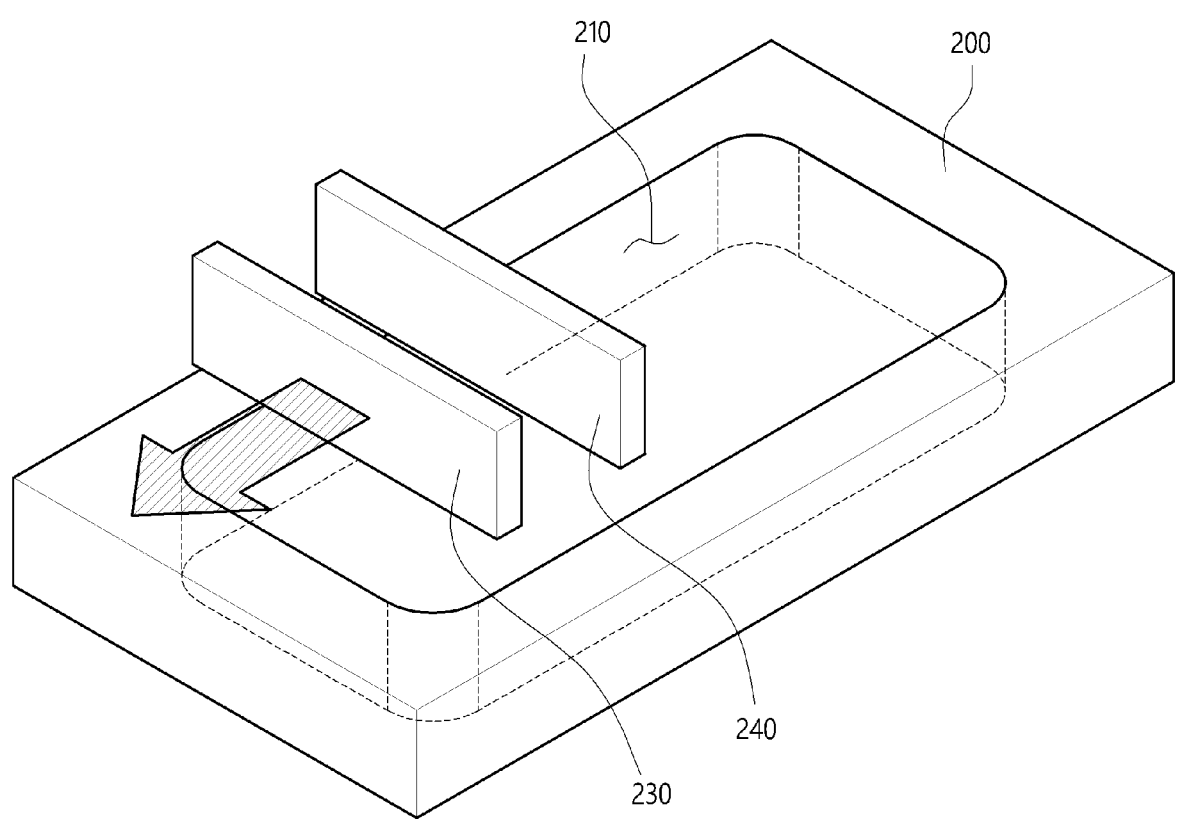

Referring to FIG. 13, an inkjet head 230 and an ultraviolet (UV) lamp 240 may be disposed above the mold 200. The inkjet head 230 and the UV lamp 240 may move in a direction, for example as indicated by the arrow of FIG. 13. The inkjet head 230 may be disposed ahead of the UV lamp 240 in the moving direction of the inkjet head 230 and the UV lamp 240. The window raw material WMm may be ejected from the inkjet head 230 into the mold 200 and may be precured by applying UV light with the use of the UV lamp 240. FIG. 13 illustrates an example in which S110 and S120 of FIG. 9 may be performed together, but the disclosure may not be limited thereto. Alternatively, the inkjet head 230 and then the UV lamp 240 may move in a direction.

Figure 14:
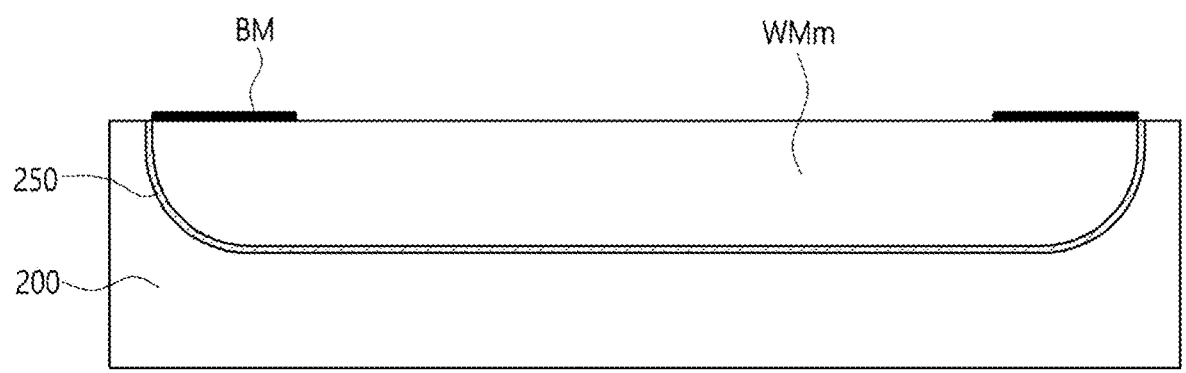
Figure 15:
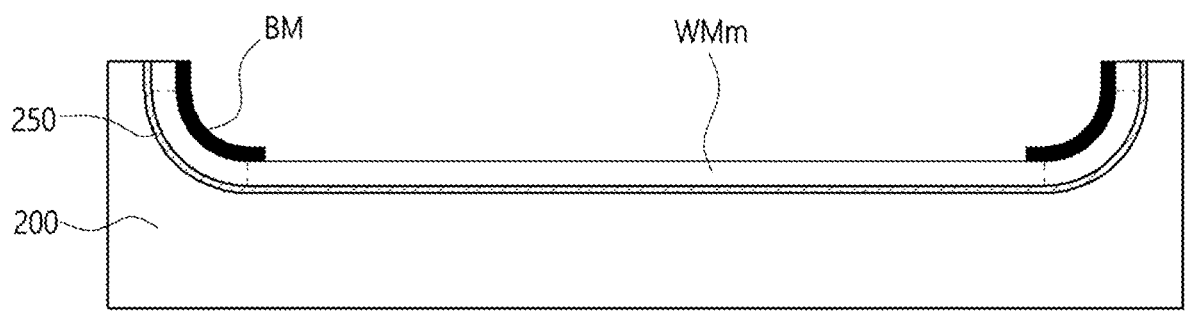

Thereafter, referring to FIGS. 9, 14, and 15, a printed pattern BM may be patterned on the window raw material WMm, which may be cured if necessary (S125). If a light-blocking layer including a black pigment, a dye, or a light absorbing material is applied as the printed pattern BM, a non-display area NDA may appear black. For example, the printed pattern BM may include a blue or a black pigment. The printed pattern BM, which defines the non-display area NDA, may be formed by an inkjet technique.

Figure 16:
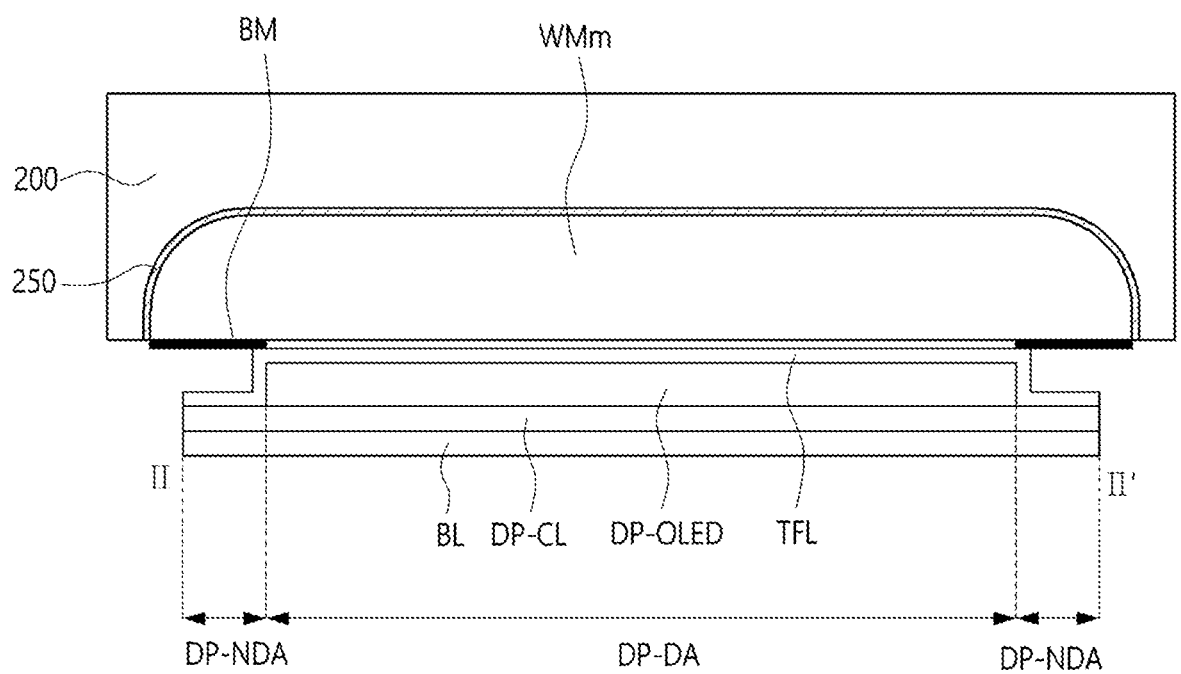
Figure 17:
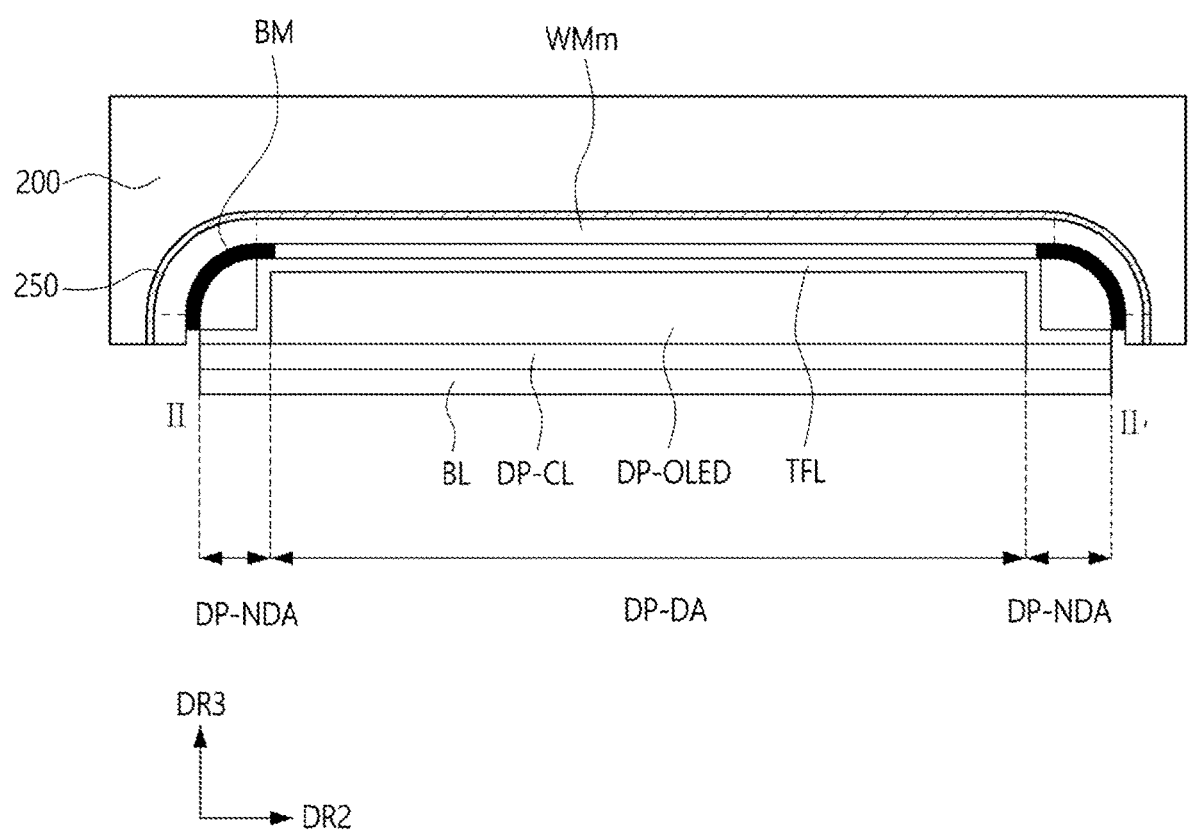

Thereafter, referring to FIGS. 9 and 16 through 18, a cover window WM may be molded (S130) by arranging the window raw material WMm, which may be precured in a state of being bonded to the mold 200, onto a display panel DP and curing the window raw material WMm. Referring to FIGS. 16 and 17, the printed pattern BM may overlap a non-display area DP-NDA of the display panel DP, but does not overlap a display area DP-DA of the display panel DP.

Figure 18:
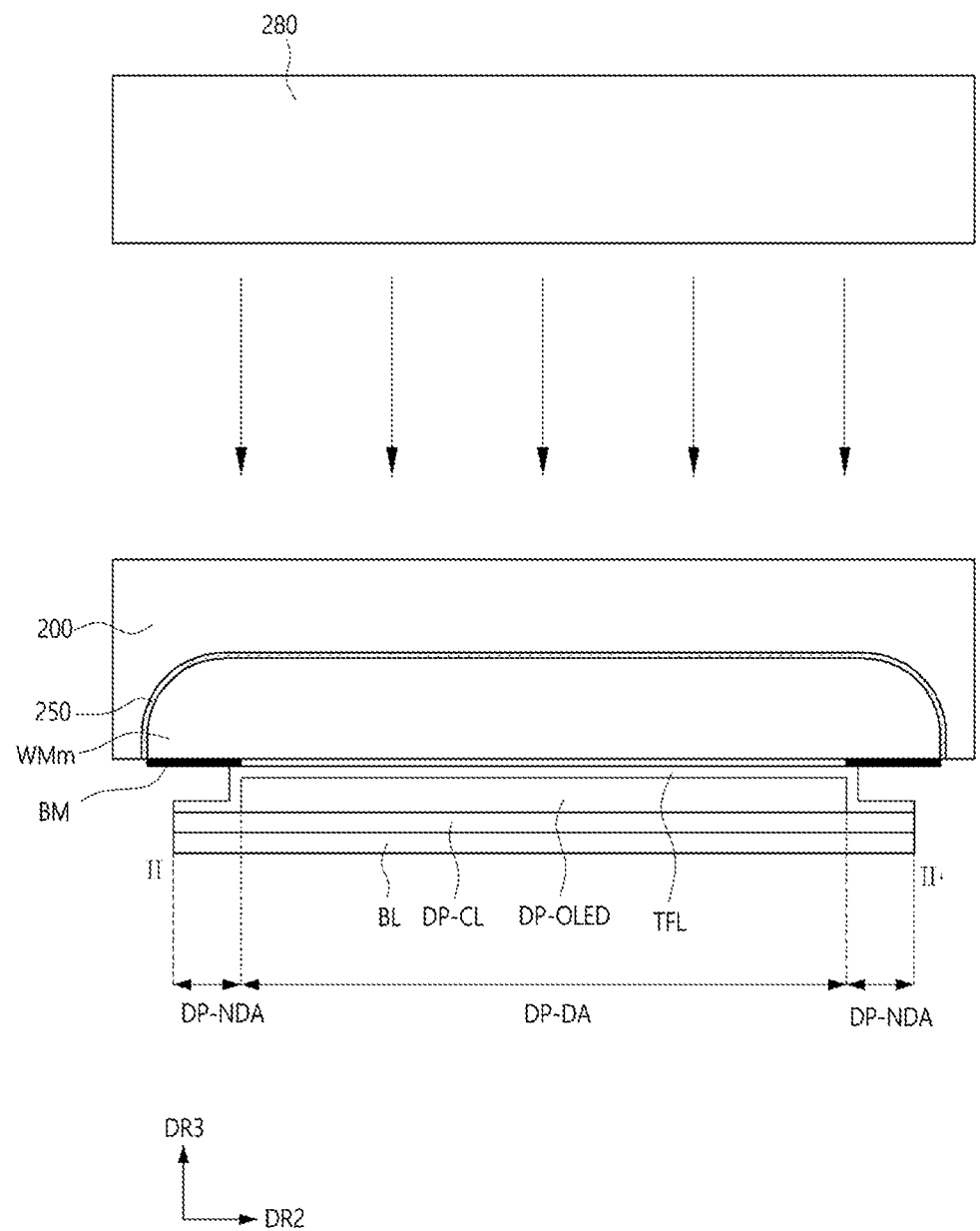

Referring to FIG. 18, a UV lamp 280 may be disposed above the window raw material WMm, which may be precured and may be disposed on the display panel DP, to cure the window raw material WMm. The energy of UV light applied by the UV lamp 280 may be higher than the energy of UV light applied in S120 by the UV lamp 240. The curing energy for curing the window raw material WMm may be about three times higher than the curing energy for precuring the window raw material WMm. The curing energy for curing the window raw material WMm may be about 2500 mJ to about 3500 mJ, preferably about 3000 mJ.

The window raw material WMm precured in S120 may have adhesiveness. In a case where the precured window raw material WMm is placed on the display panel DP and is then cured, the adhesion between the precured window raw material WMm and the display panel DP may be increased. Here, a surface of the display panel DP that may be in contact with the window raw material WMm may first be treated with plasma to enhance the bonding between the precured window raw material WMm and the display panel DP. In a case where the upper member UM of FIG. 2 is further disposed on the display panel DP, the top surface of the upper member UM that may be in contact with the precured window raw material WMm may be treated with plasma.

Plasma treatment may be a process of removing some of the surface ingredients of a material with an active gas to enlarge the surface area of the material. Thus, the surface area between the precured window raw material WMm and the display panel DP may be enlarged, and as a result the adhesion between the cover window WM and the display panel DP may be enhanced. In an embodiment where the precured window raw material WMm may be placed on the display panel DP and may then be cured, an adhesive member for bonding the cover window WM to the display panel DP may not be needed.

Figure 19:
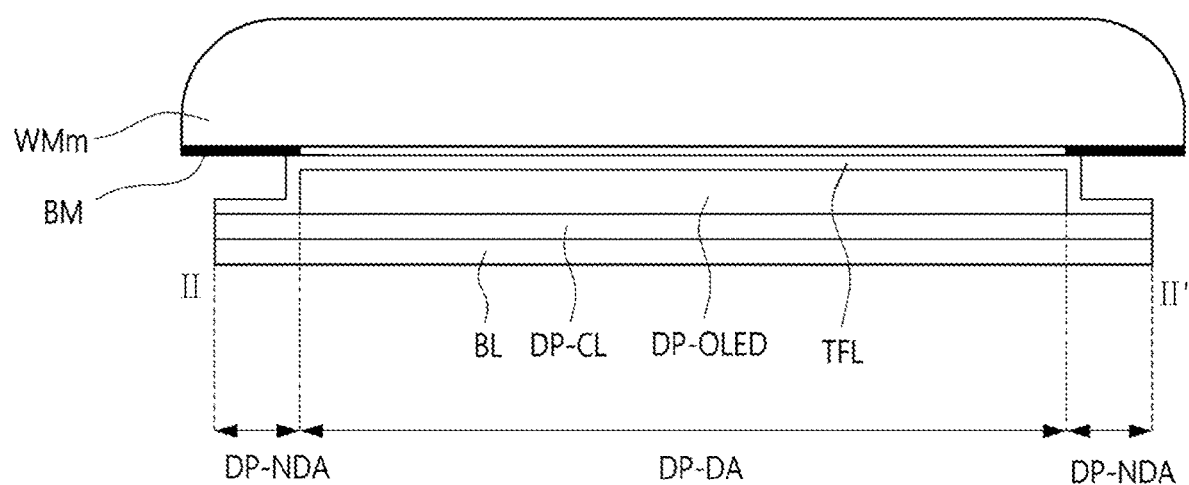

Thereafter, referring to FIGS. 9 and 19, the mold 200 may be separated from the cover window WM (S140). Here, the adhesion between the mold 200 and the cover window WM may be much stronger than the adhesion between the cover window WM and the display panel DP. In a case where the support surface 210 of the mold 200 may be coated with the release agent 250, the mold 200 may be readily separated from the cover window WM.

Figure 20:
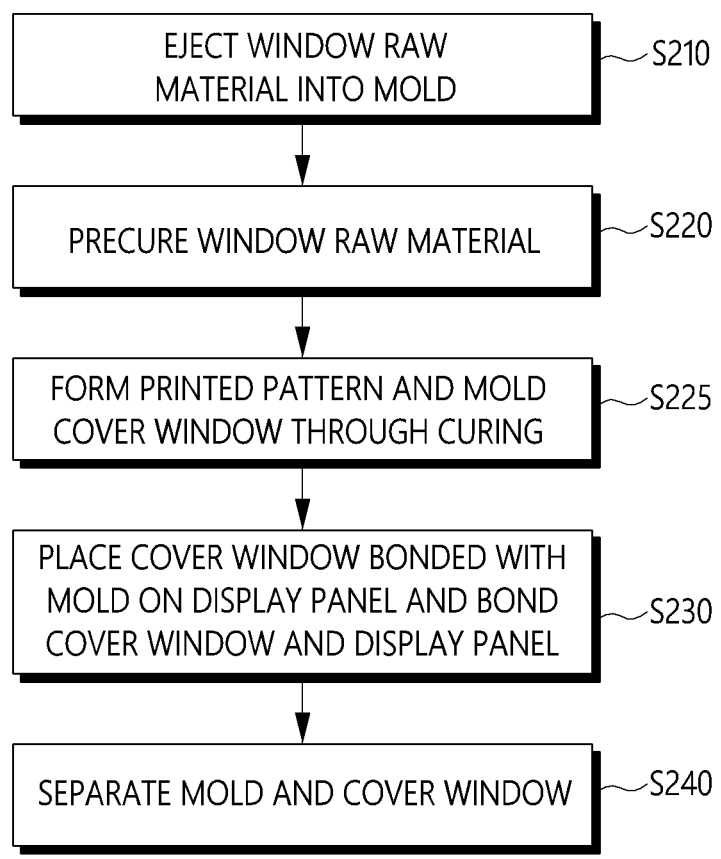
FIG. 20 is a flowchart illustrating a method of manufacturing a display device according to an embodiment of the disclosure.
Figure 21:
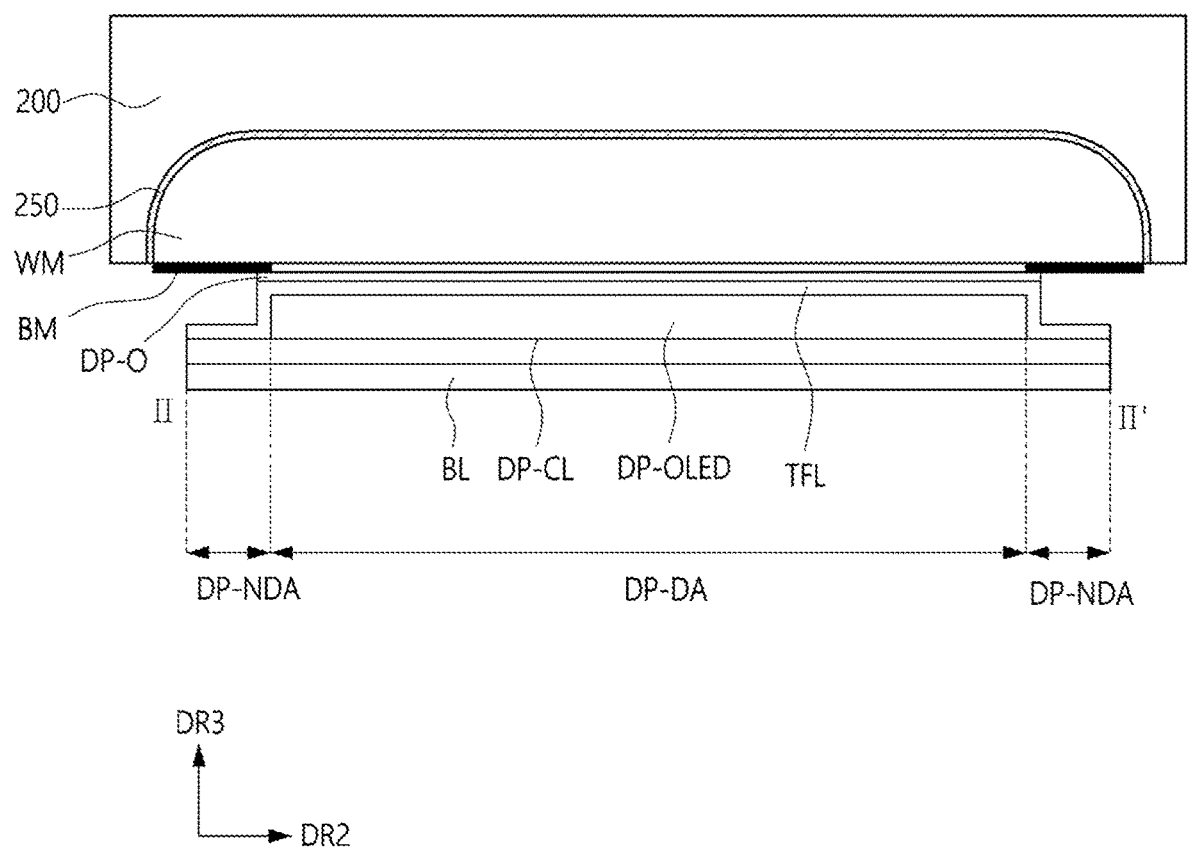
FIGS. 21 and 22 are schematic cross-sectional views illustrating the method of FIG. 20.
Figure 22:
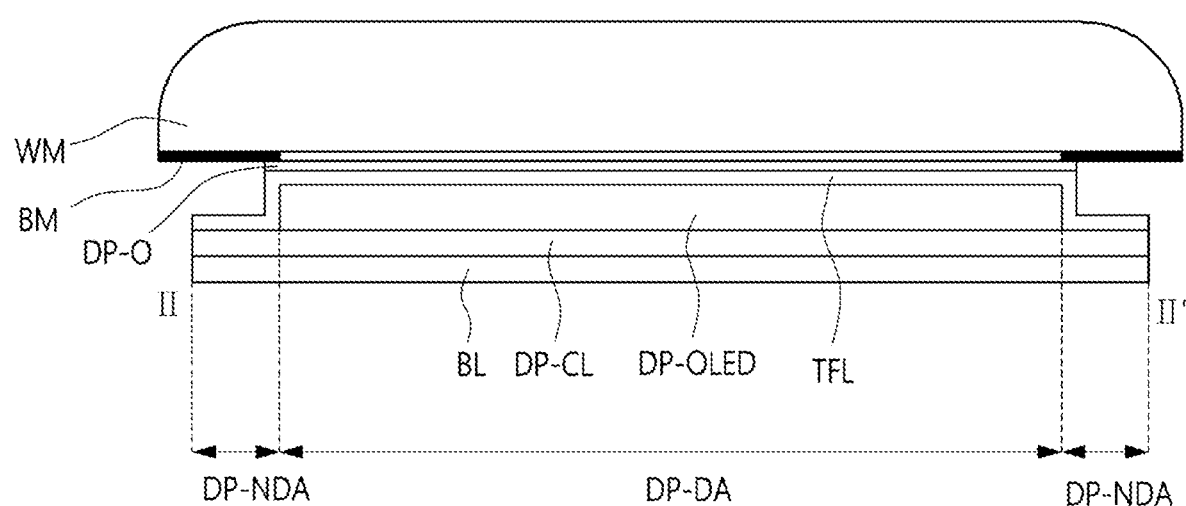

FIG. 20 is a flowchart illustrating a method of manufacturing a display device according to an embodiment of the disclosure, and FIGS. 21 and 22 are schematic cross-sectional views illustrating the method of FIG. 20. Referring to FIG. 20, the method may include the steps of fabricating a cover window and bonding the cover window to the display panel DP. The step of fabricating the cover window may include S210, S220, and S225, and the step of bonding the cover window may include S230 and S240 of FIG. 20.

Specifically, a window raw material WMm may be ejected into a mold 200 (S210). Step S210 may be the same as S110 of FIG. 9 and thus a detailed description thereof will be omitted. Thereafter, the window raw material WMm may be precured (S220). Step S220 may be the same as S120 of FIG. 9 and thus a detailed description thereof will be omitted. Thereafter, a printed pattern BM may be patterned on the window raw material WMm if necessary, and the window raw material WMm and the printed pattern BM may be cured (S225). Step S225 may be almost the same as S125 of FIG. 9, and thus, a detailed description thereof will be omitted. The curing energy for curing the window raw material WMm in S225 of FIG. 20 may be about three times higher than the curing energy for precuring the window raw material WMm in S220. The curing energy for curing the window raw material WMm may be about 2500 mJ to about 3500 mJ, preferably about 3000 mJ. Thereafter, a cover window WM bonded with the mold 200 may be placed on and bonded to a display panel DP (S230).

Referring to FIG. 21, an adhesive layer DP-O may be formed by applying an adhesive onto the display panel DP. The adhesive layer DP-O may include an optically clear adhesive (OCA) or an optically clear resin (OCR), but the disclosure may not be limited thereto. The OCA or OCR may be a pressure sensitive adhesive (PSA), but the disclosure may not be limited thereto.

Thereafter, the cover window WM and the display panel DP may be bonded together by placing the cover window WM bonded to the mold 200 onto the adhesive layer DP-O of the display panel DP. Thereafter, the mold 200 may be separated from the cover window WM (S240).

In concluding the detailed description, those skilled in the art will appreciate that many variations and modifications may be made to the embodiments without substantially departing from the principles and spirit and scope of the disclosure. For example, instead of using an inkjet technique to eject the window raw material WMm into a mold 200, a 3D printing technique or an additive manufacturing technique may instead be employed. Therefore, the disclosed embodiments are used in a generic and descriptive sense only and not for purposes of limitation.

What is claimed is:
1. A method of manufacturing a display device, comprising:
providing a mold to hold, contain, and shape a window raw material;
ejecting the window raw material into the mold;
precuring the ejected window raw material;

molding a cover window by placing the precured window raw material onto a display panel and curing the precured window raw material; and separating the mold from the cover window after the curing.

2. The method of claim 1, wherein in the ejecting of the window raw material, the window raw material is ejected into the mold by inkjet technique.

3. The method of claim 1, wherein the window raw material comprises a material selected from a group consisting of siloxane, epoxy, and a combination thereof, and the cover window comprises of a material selected from a group consisting of siloxane, epoxy, and a combination thereof.

4. The method of claim 1, wherein a curing energy used in the molding the cover window is about three times higher than a curing energy used in the precuring of the window raw material.

5. The method of claim 4, wherein the curing energy used in the precuring the window raw material is in a range of about 800 mJ to about 1200 mJ.

6. The method of claim 4, wherein the curing energy used in the molding of the cover window is in a range of about 2500 mJ to about 3500 mJ.

7. The method of claim 1, wherein the molding of the cover window further comprises treating a top surface of the display panel to which the precured window raw material is bonded with plasma before the placing of the precured window raw material onto the display panel.

8. The method of claim 1, further comprising, between the precuring of the ejected window raw material and the molding of the cover window:

forming a printed pattern that defines a non-display area of the display device on the precured window raw material, wherein the printed pattern comprises a material selected from a group consisting of a black pigment, a dye, a light absorbing material, and a combination thereof, and the display device further including a display area where pixels are disposed and an image is displayed, the non-display area surrounding and being outside of the display area in plan view, the non-display area corresponding to sides of the display device.

9. The method of claim 8, wherein the printed pattern is produced by an inkjet technique.

10. The method of claim 1, further comprising, before the ejecting of the window raw material into the mold:

applying a release agent onto a support surface of the mold onto which the window raw material is to be ejected.

11. The method of claim 1, wherein the display panel comprises:

a display element layer disposed on a substrate, the display element layer including a plurality of pixels that include:

a plurality of pixel electrodes;

a plurality of light-emitting layers;

a common electrode; and a pixel-defining film that defines the plurality of pixels; and a thin-film encapsulation layer disposed on the display element layer.

12. The method of claim 10, wherein at least one of an optical film and an input detection sensor is further disposed on the display panel.

13. A method of manufacturing a display device, comprising:

a mold to receive and contain a window raw material;

ejecting the window raw material into the mold;

precuring the ejected window raw material;

forming a printed pattern that defines a non-display area of the display device on the precured window raw material;

molding a cover window by curing the precured window raw material;

bonding the cover window disposed in the mold to a display panel by using an adhesive; and separating the mold from the cover window after the molding and the bonding.

14. The method of claim 13, wherein in the ejecting of the window raw material, the window raw material is ejected into the mold by an inkjet technique.

15. The method of claim 14, wherein the window raw material comprises a material selected from a group consisting of siloxane, epoxy, and a combination thereof, and the cover window comprises a material selected from a group consisting of siloxane, epoxy, and a combination thereof.

16. The method of claim 15, wherein the printed pattern comprises a material selected from a group consisting of a black pigment, a dye, a light absorbing material, and a combination thereof.

17. The method of claim 16, wherein the printed pattern is formed by an inkjet technique.

18. The method of claim 13, wherein the adhesive comprises a material selected from a group consisting of an optically clear adhesive (OCA), an optically clear resin (OCR), and a combination thereof.

19. A method of manufacturing a display device, comprising:

providing a mold to receive a window raw material;

ejecting the window raw material into the mold;

precuring the ejected window raw material;

forming a printed pattern that defines a non-display area of the display device on the precured window raw material; and molding a cover window by curing the precured window raw material, wherein a surface of the cover window has a profile that conforms to a profile of a surface of the mold.

20. The method of claim 19, wherein in the ejecting of the window raw material, the window raw material is ejected into the mold by an inkjet technique, the window raw material comprises a material selected from a group consisting of siloxane, epoxy, and a combination thereof, and the cover window comprises a material selected from a group consisting of siloxane, epoxy, and a combination thereof.

21. The method of claim 1, wherein the mold having rounded corners, and the cover window having a curved surface at edges to correspond to the rounded corners of the mold.

22. The method of claim 1, wherein the mold includes at least one of polyethylene terephthalate (PET), polyvinyl chloride (PVC), polypropylene (PP), polyvinylidene chloride (PVDC), polyethylene (PE), polytetrafluoroethylene (PTFE).

23. The method of claim 1, further comprising:

coating a release agent onto the mold prior to the ejecting.

24. The method of claim 13, wherein the display device further comprising a display area corresponding to where pixels are disposed in the display panel and where an image is produced, and the cover window having a flat portion corresponding to the display area and a curved portion at sides of the flat portion corresponding to the non-display area of the display device.

\* \* \* \* \*